(12) United States Patent
Howard et al.

(10) Patent No.: US 9,632,686 B1
(45) Date of Patent: Apr. 25, 2017

(54) COLLABORATIVE DOCUMENT CREATION

(71) Applicant: Wells Fargo Bank, N.A., San Francisco, CA (US)

(72) Inventors: Dale Steven Howard, Clive, IA (US); Danny Ray Grizzle, Clive, IA (US); Timothy Alan Wagoner, Adel, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 336 days.

(21) Appl. No.: 14/339,971

(22) Filed: Jul. 24, 2014

(51) Int. Cl.
*G06F 3/0486* (2013.01)
*H04L 12/18* (2006.01)
*G06F 3/0485* (2013.01)

(52) U.S. Cl.
CPC .......... *G06F 3/0486* (2013.01); *G06F 3/0485* (2013.01); *H04L 12/1822* (2013.01)

(58) Field of Classification Search
CPC .... G06T 19/006; G06F 3/0486; G06F 3/0485
See application file for complete search history.

(56) References Cited

U.S. PATENT DOCUMENTS

| | | |
|---|---|---|
| 6,020,891 A | 2/2000 | Rekimoto |
| 7,069,516 B2 | 6/2006 | Rekimoto |
| 7,167,142 B2 | 1/2007 | Buckley et al. |
| 8,438,110 B2 | 5/2013 | Calman et al. |
| 9,191,620 B1 * | 11/2015 | Katzer ................... H04N 7/157 |
| 2006/0115130 A1 | 6/2006 | Kozlay |
| 2008/0126937 A1 * | 5/2008 | Pachet ................... G06F 3/017 715/720 |
| 2008/0159305 A1 | 7/2008 | Morris et al. |
| 2009/0030767 A1 * | 1/2009 | Morris ............... G06Q 10/1093 705/7.18 |
| 2009/0231413 A1 * | 9/2009 | Dunko .................. H04N 7/142 348/14.08 |
| 2010/0005519 A1 | 1/2010 | Lim |
| 2011/0285829 A1 | 11/2011 | Mori et al. |
| 2012/0231424 A1 | 9/2012 | Calman et al. |
| 2012/0231814 A1 | 9/2012 | Calman et al. |
| 2012/0232937 A1 | 9/2012 | Calman et al. |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |

(Continued)

FOREIGN PATENT DOCUMENTS

WO 2007/063306 A2 6/2007

OTHER PUBLICATIONS

"Live help/call center application with Flex and Blaze DS" pp. 1-3 Date: Jun. 9, 2008; Christope Coenraets.*

(Continued)

*Primary Examiner* — Sherrod Keaton
(74) *Attorney, Agent, or Firm* — Merchant & Gould P.C.

(57) ABSTRACT

A method implemented on an electronic computing device includes displaying a document. An image of a person is received. The image of the person is overlaid onto at least a portion of the image of the document. One or more movements are received from the person. The image of the person is moved to indicate a specific area of the document. The movement of the image of the person to the specific area of the document is based on the one or more movements from the person.

18 Claims, 6 Drawing Sheets

(56) References Cited

U.S. PATENT DOCUMENTS

| | | |
|---|---|---|
| 2012/0233015 A1 | 9/2012 | Calman et al. |
| 2012/0233032 A1 | 9/2012 | Calman et al. |
| 2012/0233072 A1 | 9/2012 | Calman et al. |
| 2013/0033522 A1 | 2/2013 | Calman et al. |
| 2014/0188756 A1* | 7/2014 | Ponnavaikko ..... G06K 9/00449 705/342 |

OTHER PUBLICATIONS

U.S. Appl. No. 14/588,660, filed Jan. 2, 2015 entitled "Dual-Use Display Screen for Financial Services Applications ".

Forte, Andrea G. et al., "EyeDecrypt—Private Interactions in Plain Sight," http://eprint.iacr.org/2013/590.pdf, Proc. 9th Conference on Security and Cryptography for Networks, 2013, 19 pages.

Rekimoto, Jun et al., "Augmented Surfaces: A Spatially Continuous Work Space for Hybrid Computing Environments," https://www.sonycsl.co.jp/person/rekimoto/papers/chi99.pdf, 1999, 8 pages.

Almo, "2013 Interactive Buying Guide," http://www.almoproav.com/Resources/BuyingGuides/Interactive/assets/InteractiveBG_2013.pdf, 2013, 29 pages.

Miller, Paul, "Google Glass apps: everything you can do right now," http://www.theverge.com/2013/5/20/4339446/google-glass-apps-everything-you-can-do-right-now, May 20, 2013, 20 pages.

Mölers, Max et al., "TaPS Widgets: Interacting with Tangible Private Spaces," http://hci.rwth-aachen.de/materials/publications/moellers2011a.pdf, Copyright 2011, 4 pages.

Olwal, Alex et al., "ASTOR: An Autostereoscopic Optical See-through Augmented Reality System," http://cs.iupui.edu/~tuceryan/pdf-repository/Olwal2005.pdf, Oct. 2005, 4 pages.

Rekimoto, Jun et al., "Perceptual Surfaces: Towards a Human and Object Sensitive Interactive Display," http://mrl.nyu.edu/~perlin/courses/spring2006/shadowwalls/pui97[1].pdf, 1997, 3 pages.

Robinson, John et al., "The LivePaper System: Augmenting Paper on an Enhanced Tabletop," 2001, 23 pages.

* cited by examiner

COLLABORATIVE DOCUMENT CREATION

BACKGROUND

Personal banking often requires customers to fill out one or more forms. The forms are typically used for such things as loan applications, mortgage applications, opening up a checking account, etc. Typically, customers meet face to face with a banker or other financial employee when filling out the forms. However, sometimes customers are required to fill out forms that they receive through the mail or that they receive in an email, or via a link on a website, etc.

Sometimes customers may be confused about certain sections of a financial document and may not know how to answer certain questions or may overlook certain sections that are required. When the customer fills out the financial document outside of a bank or financial institution, for example at home, the customer may not be able to obtain help when needed. Even if a customer calls the bank or other financial institution for help or perhaps engages in an online chat with a bank employee, the customer may have questions or be confused about what is required. In addition, the bank employee may not be confident that the customer is filling out the form correctly and completely. These situations may cause multiple iterations of passing a form from the customer to the bank employee and back to the customer, which can delay completing a desired action for the customer and can be undesirable from a customer's perspective.

SUMMARY

Embodiments of the disclosure are directed to a method implemented on an electronic computing device. The method comprises: on the electronic computing device, displaying a document; receiving an image of a person; overlaying the image of the person onto at least a portion of the image of the document; receiving one or more movements from the person; and moving the image of the person to indicate a specific area of the document, the movement of the image of the person to the specific area of the document being based on the one or more movements from the person.

In another aspect, a method implemented on an electronic computing device comprises: on the electronic computing device, displaying a financial document, the financial document including a live image of a person overlaid onto at least a portion of the financial document, the live image of the person being captured by a camera remote from the electronic computing device; allowing for selection of a writeable area of the financial document, the writeable area being identified via the image of the person overlaid on the financial document; receiving one or more alphanumeric characters in the writeable area of the financial document; displaying the one or more alphanumeric characters in the writeable area of the financial document; saving changes to the financial document; and downloading the financial document to the electronic computing device.

In yet another aspect, an electronic computing device comprises: a processing unit; and system memory, the system memory including instructions which, when executed by the processing unit, cause the electronic computing device to: display a financial document received from a server computer; receive an image of a person, the image of the person being received from a camera that is focused on the person and connected to the electronic computing device; superimpose the image of the person on the image of the financial document; receive one or more gestures from the person, the gestures comprising one or more of moving an arm and a hand of the person; move the document relative to the image of the person to indicate a specific area of the financial document, the movement of the document relative to the image of the person to the specific area of the financial document being based on the one or more gestures from the person; receive one or more additional gestures from the person focused on the specific area of the financial document; as a result of the one or more additional gestures from the person, highlight the specific area of the financial document, the highlighting of the specific area of the financial document comprising applying a color to the specific area of the financial document; receive data for the specific area of the financial document from the server computer; display the data in the specific area of the financial document; and download a copy of the financial document from the server computer.

The details of one or more techniques are set forth in the accompanying drawings and the description below. Other features, objects, and advantages of these techniques will be apparent from the description, drawings, and claims.

DETAILED DESCRIPTION

Figure 1:
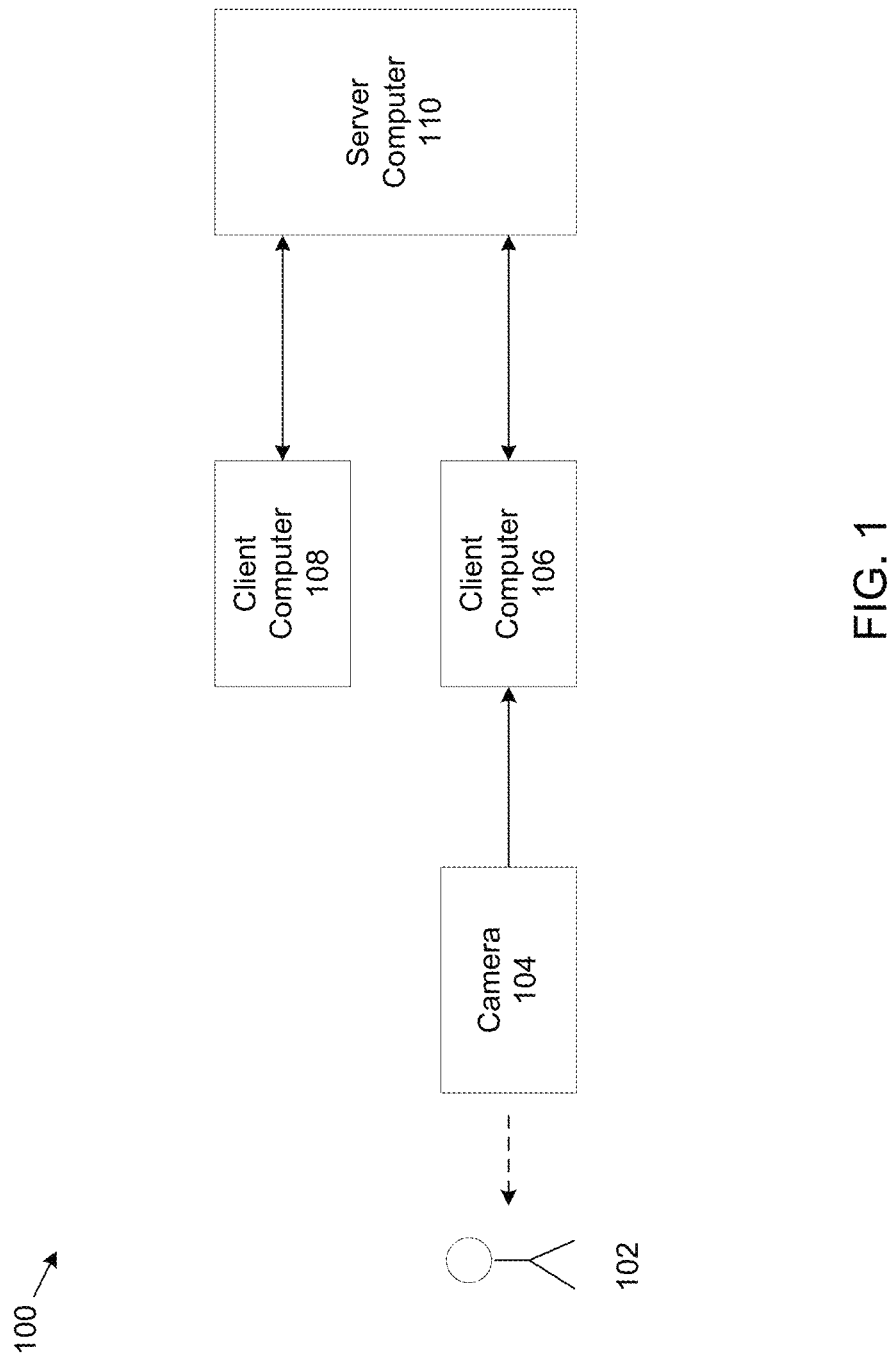
FIG. 1 shows an example system that may be used for collaborative document creation.

The present disclosure is directed to systems and methods for collaborative document creation. The systems and methods permit an image of a person to virtually appear on or adjacent to a document and direct a customer in filling out sections of the document and/or filling in portions of the document for the customer at the customer's request and approval. As used herein, an "image" of a person encompasses live images or video of the person. The document is typically a financial document such as an application for a banking account, a loan or a mortgage. The person is typically an employee of a financial institution, for example a banker. In this disclosure, the employee of the financial institution is referred to as the banker.

Using the systems and methods, the banker and the customer may be at different physical locations. For example, the banker may be located at a financial institution or other commercial place of business and the customer may be at home. The banker and the customer each view a virtual copy of the document. In some embodiments, the banker and the customer each view the virtual copy of the document on two or more client computers. In other embodiments, one or more of the banker and customer view the virtual copy of the document on an augmented reality (AR) device. For example, the customer can capture a physical document with his or her AR device, and the banker can be overlaid on the document via a display on the AR device, as described in more detail later herein.

The banker and the customer also typically have a voice connection, for example the banker may telephone the customer or the customer may telephone the banker or utilize Voice Over IP (VOIP) technology. The voice connection permits the banker to tell the customer which areas of the document to fill in. Alternatively, the customer and banker may communicate via microphones associated with their respective systems. Using the systems and methods, a computer connection permits the banker to show the customer a specific area of the document and to visually observe that the customer is filling in the correct area of the document. In some embodiments, such as those for customers who have been identified as being hearing impaired, the banker's instructions may also be shown on a display screen for the user via closed captioning, or the banker or an interpreter can use sign language to relay the instructions.

In some embodiments, a three-dimensional camera focuses on the banker. The camera is connected to the client computer for the banker. In some embodiments, the client computer includes software that integrates an image of the banker into a section of the document. The integration superimposes or overlays the image of the banker adjacent to or on at least a portion of the document. The image of the banker superimposed on the document is sent to the server computer. When a customer obtains a copy of the document from the server computer, the customer can also see the image of the banker superimposed on the document. In some embodiments, the image of the banker may be positioned in other locations, for example beside the document, instead of superimposed on the document.

In an alternative embodiment, the customer may use a camera on an AR device or mobile device to capture and transmit a live image of a physical document at the customer's location to the banker's client computer. A camera at the banker's client computer can then transmit an image of the banker to the customer's AR device, either directly or via the customer's computer. The banker's image appears in the customer's AR device and is virtually overlaid on the physical document when the customer views the physical document through the AR device. The customer can move the image of the banker relative to the document by moving the AR device relative to the document. Moving the image of the banker relative to the document may allow the customer to decide which portion of the document to review and revise with the assistance of the banker.

In some embodiments, the image of the document captured by the AR device can be converted into an editable electronic document, for example using optical character recognition (OCR). The image of the document can be converted using software on the AR device, or the image of the document can be transmitted to another device connected to, or otherwise associated with, the AR device, such as the customer's client computer. The banker can move his or her image relative to or manipulate the electronic document generated in this way, using the systems and methods described herein. The customer can use other devices connected to or otherwise associated with the AR device or client computer, such as a connected keyboard, electronic pen, or other input device, to enter data into the electronic version of the physical document.

In another embodiment, the customer may use a webcam to capture a live image of a document. An image of the banker may be overlaid on the document as the document, as captured by the client's webcam, is displayed on the customer's client computer.

In some examples, the software on the client computer for the banker permits certain movement or gestures of the banker to translate to certain actions on the document. For example, when the banker moves, walks or otherwise moves laterally in front of the camera, the image of the banker may make a corresponding move on or relative to the image of the document. When the banker wants to point to a specific part of the document, the banker moves his/her arm or hand until one or more fingers point to the specific section of the document. When the superimposed image of the banker points to the specific part of the document, the same superimposed image of the banker pointing to the specific part of the document is displayed to the customer on the customer's client computer. In this manner, if the customer is not clear about which area of the document needs to be filled out, the banker can point to the area of the document on the banker's client computer. The customer, in turn, can see where the banker is pointing on the image of the document on the customer's client computer.

The banker may also be able to highlight an area of the document, for example by pointing to a specific area of the document and issuing a gesture for highlighting. For example, a certain motion of the left hand combined with the banker pointing to the area of the document with his/her right hand may cause the area of the document to be highlighted with a color. Other methods of highlighting may be used. For example, the banker may click a highlighting button or an icon on the display screen before pointing to the document.

Other actions by the banker are possible. For example, when the banker moves an arm in an upward direction the document may scroll up and when the banker moves the arm in a downward direction, the document may scroll down.

When filling out a form, the customer may be asked to provide certain verification documents, for example pay stubs, W-2 forms, copies of bank statements, etc. Using the systems and methods, the customer may be able to take pictures of or otherwise image/scan any needed verification documents, attach images of the verification documents using an attach button and send the images of the verification documents to server computer 110.

When the customer completes a document, the customer may press or click a button on or near the document to download the completed document to the customer's client computer. The banker may also press or click a button on or near the document to download the completed document to the banker's client computer or enter any data entered on the document into the bank system for processing.

In some embodiments one or more augmented reality (AR) devices may be used instead of client computers. For example, a customer may receive a bill or other document that the customer does not understand. The customer may scan the bill or document with an AR device. The scanning of the bill or document may activate a software application on the AR device. The software application may cause the document to be sent to a banker's queue, for example an email inbox. The banker may view the document on an AR device that the banker may be wearing. In addition, if the banker has access to a three-dimensional camera and the AR device includes software for integrating an image onto the document, the banker may be able to superimpose the camera image of the banker onto the document. The superimposed image may in turn be viewed by customer on the AR device of the customer.

The systems and methods are generally described for an AR device that may be worn or carried by a user. An example of and AR device that may be worn by the user is an AR headset. An example of an AR device that may be carried by the user is a smart telephone or tablet computer that includes AR components such as a processor, display and camera and an AR software application.

The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some embodiments, the wearable computer also includes biometric capability such as facial recognition, retinal scan capability, finger print and voice print capability. The optical display reflects projected images and also permits the user to see through the display.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, Calif.

FIG. 1 shows an example system 100 that supports collaborative document creation. The example system 100 includes a banker 102, a three-dimensional camera 104, client computers 106, 108 and server computer 110.

Client computer 106 is a client computer at a location of the banker. The client computer 106 has a connection to server computer 110. The connection may be part of a corporate network or it may be a remote connection over a network such as the Internet. In addition the client computer 106 is connected to the camera 104. The camera 104 is focused on the banker 102. The client computer 106 includes software that integrates the image of the banker with an image of a document displayed on client computer 106. The document is obtained from server computer 110.

Server computer 110 is a server computer associated with a financial institution, such as a bank. Server computer 110 stores or has access to one or more documents that may be displayed to users at client computer 106 and client computer 108. For the example system 100, the documents are typically financial documents, for example a loan application or a mortgage application, an application to purchase a mutual fund, etc. In some embodiments, server computer 110 may be a web server. In these embodiments, the banker at client computer 106 and the customer at client computer 108 may each sign in to a website running on the web server in order to access the one or more documents.

Client computer 108 is a client computer of a customer. Client computer 108 is typically at a location remote from that of the banker 102 and from server computer 110. For example, client computer 108 may be in the customer's home or place of employment. The customer may access a copy of the document from server computer 110. As discussed, the image of the banker may be superimposed on the image of the document. Actions taken by the banker 102 at client computer 106 may also be viewed at client computer 108. For example, when an image of the banker points to a specific section of the document at client computer 106, the same image of the banker pointing to the same section of the document may be used by the customer at client computer 108.

Figure 2:
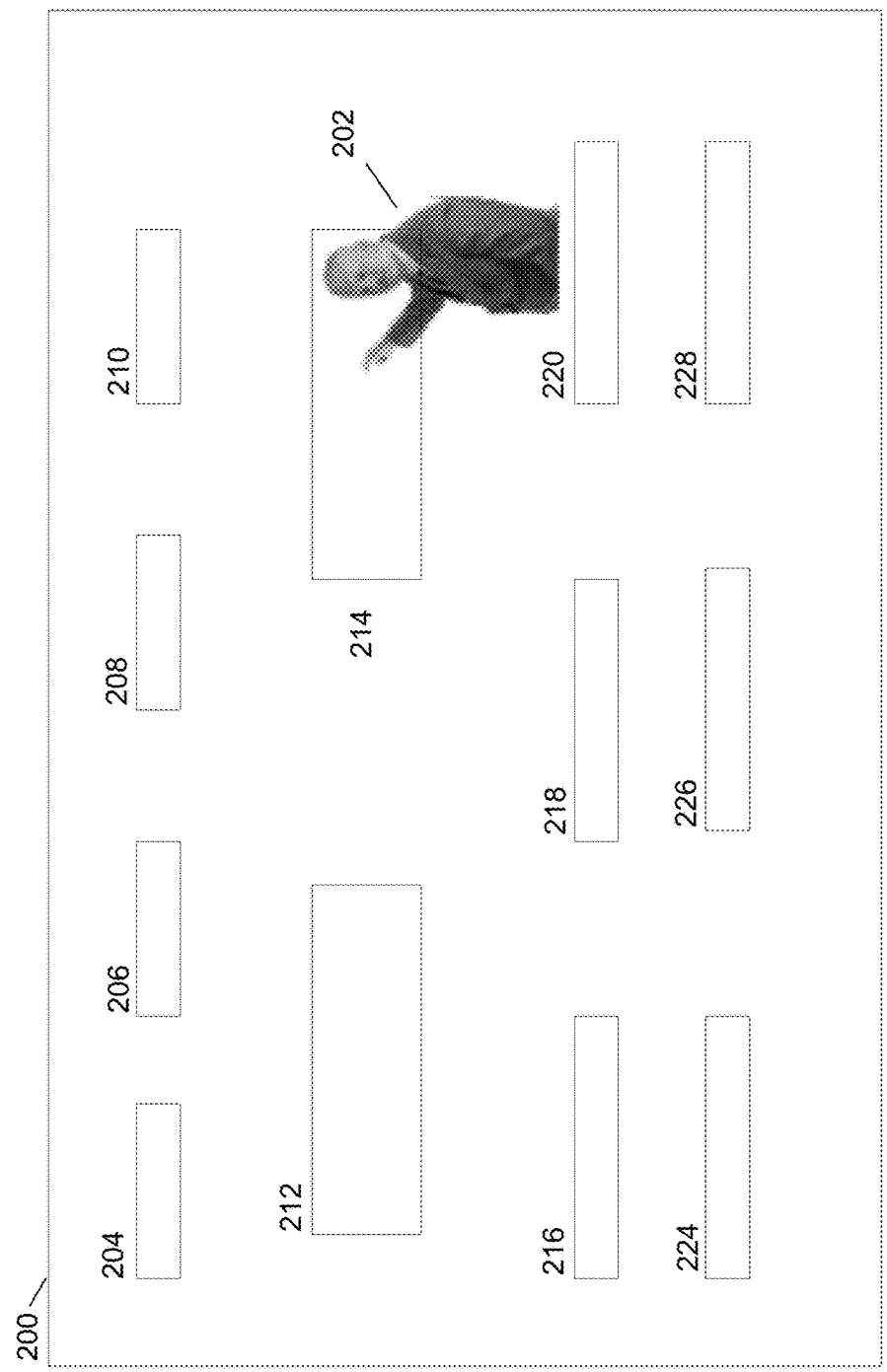
FIG. 2 shows an example document with an image of a banker superimposed on the document.

FIG. 2 shows an example document 200 with a banker 202 superimposed on it. The document 200 includes areas 204-228. The example areas 204-228 may include text, photos, drawings, and one or more edit boxes in which a user may enter data. As shown in FIG. 2, the banker 202 is pointing to area 214. In the document 200, area 214 is an edit box. By pointing to area 214, the banker indicates to the customer that the customer is to enter data into the edit box in area 214. For example, the customer may enter data such as a name, an identifier such as a social security number, a monthly salary, etc. In addition, when the customer enters the data into the area 214, the banker can view the data on the example document 200 as the customer is entering it.

As discussed earlier herein, in some embodiments the banker moves laterally, for example by walking in front of the camera. When the banker moves laterally, the image of the banker also moves laterally relative to the document displayed virtually behind the banker. When the banker wants to reach a section of a document that is above or below a currently displayed section of the document, in some embodiments, the banker can use gestures to scroll the document up or down until the desired section of the document is reached. When the document is scrolled, the document moves vertically relative to the image of the banker.

In some embodiments, a dual-use screen may be used. With a dual-use screen, both the customer and the banker may simultaneously view images that the customer and the banker see. However, with the dual-use screen, the images that the customer sees may not be the same as the images that the banker sees. For example, the banker may scroll to a specific section of the document or point to a specific area of the document without the scrolling or pointing being seen at the customer's client computer 108. When the banker is ready for the customer to see any changes in the image of the document, the banker may initiate an action, for example a certain type of hand gesture, to update the image of the document at client computer 108. In addition, certain areas of the document may be blocked out or redacted in some manner for privacy reasons. For example, if the customer is to enter a social security number or an income amount in a specific area of the document, the banker may point to the specific area of the document so that the customer can see where to enter the data, but when the customer enters the data the actual data may be blanked out or redacted out on the banker's image of the document. Redacting out the specific area of the document instead of blanking out this area permits the banker to see that the customer has actually entered data in the correct edit box, but preserves the privacy of the information.

Figure 3:
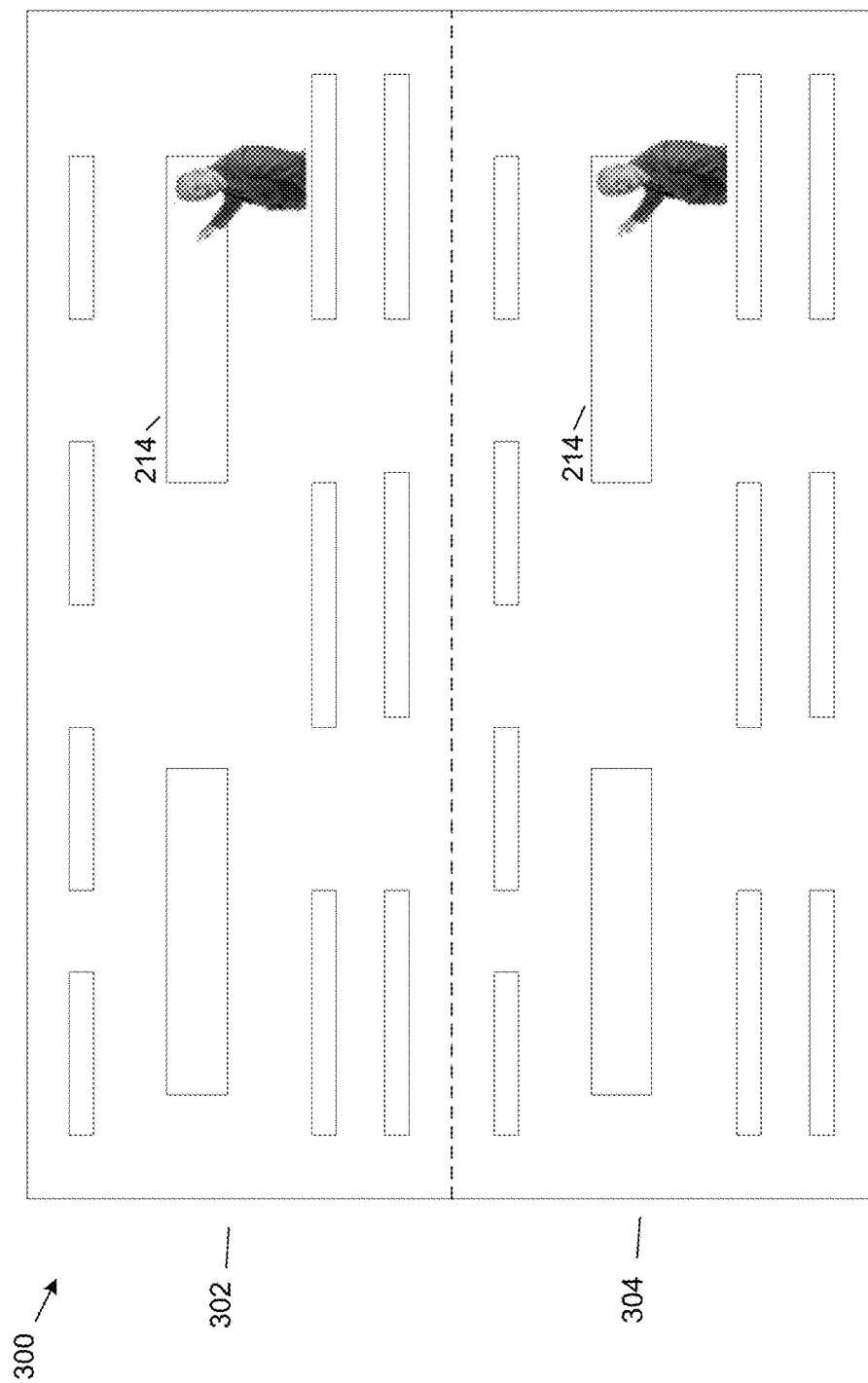
FIG. 3 shows an example dual-use display screen.

FIG. 3 shows an example dual-use screen 300. In some embodiments, the dual-use display screen 300 may be displayed on client computer 106. The dual-use display screen 300 permits the banker to see both actions by the banker and the customer as they occur. Section 302 of the dual-use screen 300 displays what the customer sees at client computer 108 and section 304 of the dual-use screen 300 displays what the banker sees at client computer 106. When the banker points to a specific area of a document, for example text box 214, the banker sees an image of the banker pointing to text box 214 on both sections 302 and 304 of the dual-use screen 300. When the customer starts entering data into text box 214, the banker can view the customer entering data into text box 214 on both sections 302 and 304 of the document.

The dual-uses screen 300 also permits actions on sections 302 and 304 of the document to occur independently of each other. For example, the banker may scroll to a specific section of the document and the customer may simultaneously view a different section of the document. The banker may then cause the section of the document that the banker is viewing to be displayed to the customer. For example, the banker may use a mouse and/or gesture to move the portion of the document that the banker is viewing to section 302 of the dual-use display screen 300. Operation of an example dual-use display screen is explained in more detail in U.S.

Patent Application Ser. No. 61/954,343, "Dual-use Display Screen for Financial Services Applications," filed on Mar. 17, 2014, the contents of which are incorporated entirely herein by reference.

Figure 4:
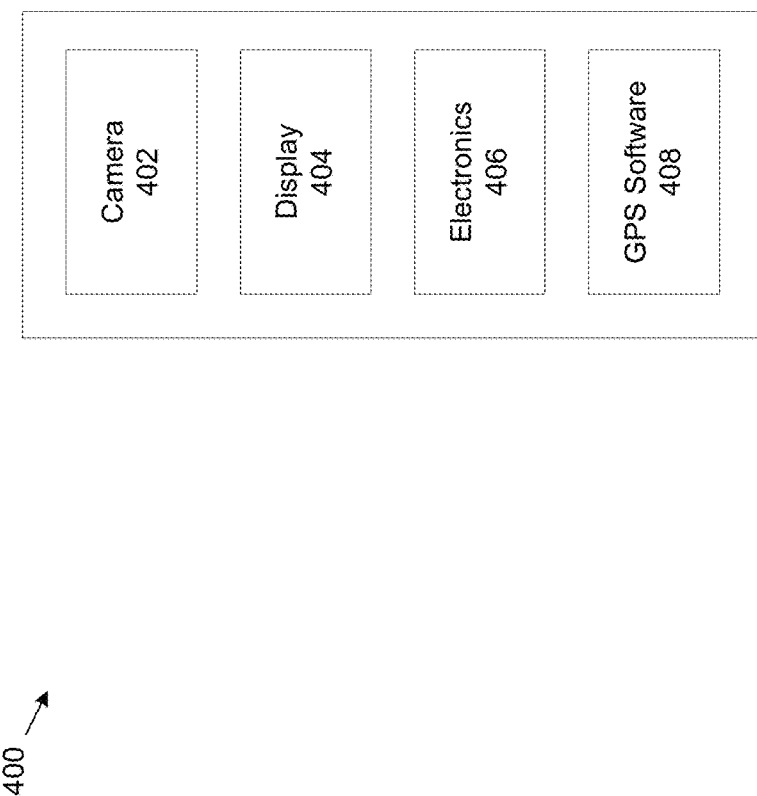
FIG. 4 shows example modules of an augmented reality (AR) device.

FIG. 4 shows example modules 400 of an AR device. In some embodiments, the AR device may be used in place of client computer 106, as discussed earlier herein. The example modules 400 include a camera 402, a display 404, electronics 406 and GPS software 408. The camera 402 is a camera that is built-in to the AR device. Display 404 is a display that is also built-in to the AR device. Electronics 406 includes an electronic computing device with wireless capability. The wireless capability may include Bluetooth, radio frequency identification (RFID) or similar types of wireless capability. GPS software 408 is typically a software application that may be installed on the mobile electronic device. When the AR device is an AR headset, camera 402, display 404, electronics 406 and GPS software 408 are part of the AR headset.

Figure 5:
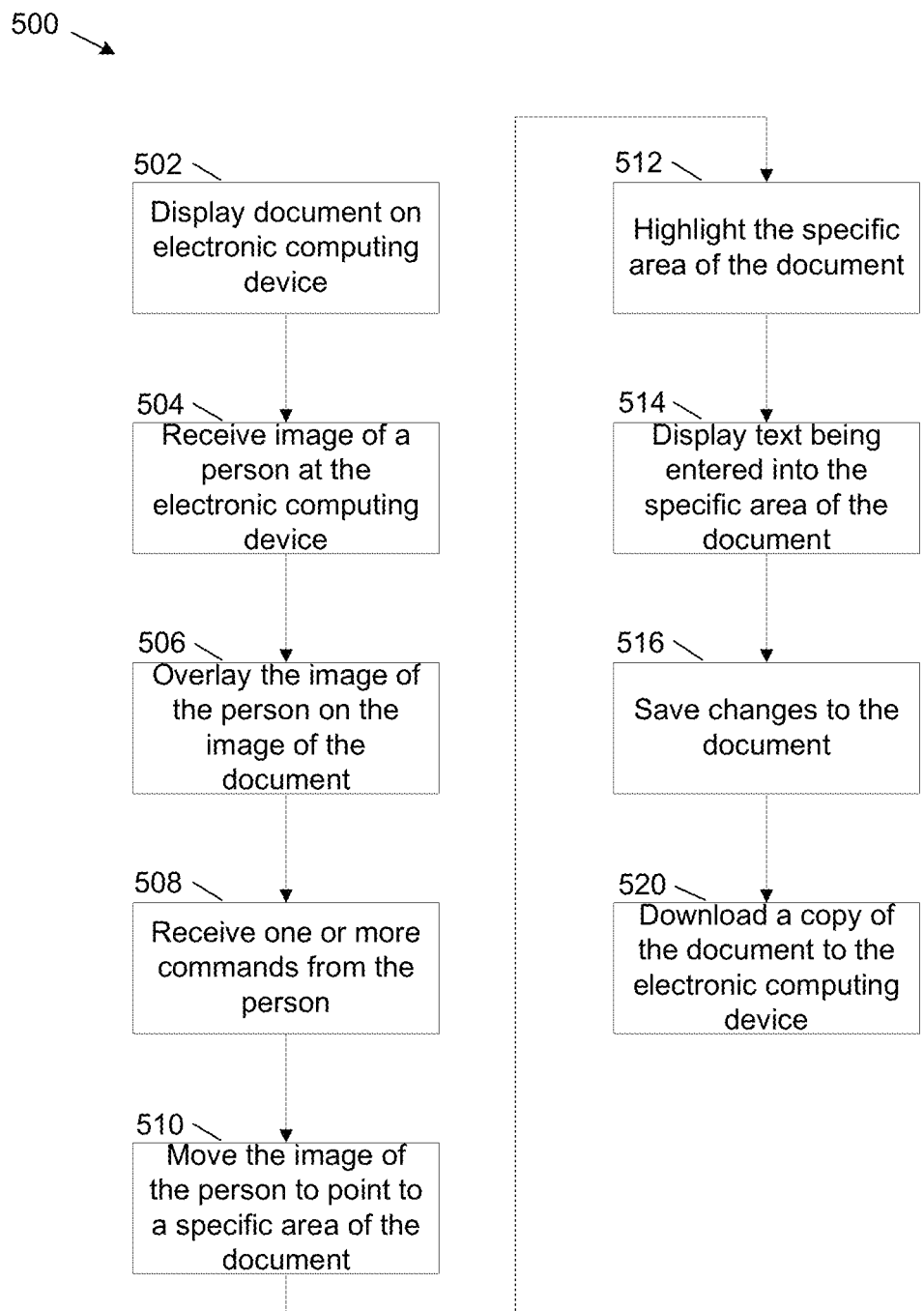
FIG. 5 shows a flowchart for an example method implemented on a client computer of FIG. 1 for collaborative document creation.

FIG. 5 shows a flowchart of a method 500 implemented on client computer 106 for collaborative document creation.

At operation 502, a document is displayed on a display screen of client computer 106. The document is typically a financial document, for example a loan application, a mortgage application or an application to open a checking account. Other types of financial documents are possible. The document is displayed to a banker at client computer 106. At the same time, the document is displayed to a bank customer at client computer 108.

The document is obtained from server computer 110. For method 500, server computer 110 is a web server computer that hosts a website for the bank. Client computers 106 and 108 each include a web browser. In some embodiments, the banker and the customer each logon to the website and access the document at client computers 106 and 108, respectively. In some embodiments, the banker and customer connect via the bank's webpage. Alternatively, an interactive session can be established between the banker and customer through other types of online meetings, such as web conferencing.

At operation 504, an image of the banker is received at client computer 106. The image is obtained from a camera that is focused on the banker. The camera is also connected to client computer 106.

At operation 506, the image of the banker is overlaid on the image of the document on the display screen of client computer 106. The image of the banker is also overlaid on the image of the document on the display screen of client computer 108.

Client computer 106 includes software that integrates the image of the banker with the image of the document. The image of the banker is overlaid on the image of the document and may be moved around on the document as directed by the banker. The overlaid image is sent to server computer 110. Server computer 110 typically stores the overlaid image of the banker on the document and makes the overlaid image available to client computer 108.

At operation 508, one or more movements or gestures are received from the banker. The movements and gestures are typically physical actions of the banker. For example, the banker can walk or otherwise move laterally in front of the camera to make a corresponding change in position of the image of the banker on the document. As another example, the banker may move his/her arms and hands, or walk in front of the camera at the banker's computer, to position the image of the banker on the document. As the banker moves his/her arms and hands, walks, or otherwise moves in front of the camera, at operation 510, the customer may observe the image of the banker being moved on the display screen. The banker may move his/her arms and hands, or walk or otherwise move, until the image of the banker is positioned on a specific area of the document. The positioning is similar to adjusting a position of a cursor on a document via movement of a pointing device such as a mouse.

The banker may also use arm or hand gestures to scroll the document on the display screen and to cause an area of the document to be highlighted. For example, the banker may move his/her arm in an upward direction to scroll the screen upward and the banker may move his/her arm in a downward direction to scroll the screen downward. Alternatively, the banker may gesture downwardly to move up in a document (and vice versa), similar to a swipe motion on a touch screen device to navigate a document. The listed gestures and document actions are merely by way of example, and the banker may use other preprogrammed gestures capable of being interpreted by the camera 104 to effectuate other changes or manipulations to the collaborative document, such as deleting text, cutting and pasting text, zooming in or out, or any other actions that can be performed on the document. In yet other examples, the customer can be allowed to move the document, such as when the customer has a specific question about a portion of the document. In such a scenario, the customer can move to that portion of the document, and the customer and the banker can review that portion of the document as described herein.

At operation 512, a specific area of the document is highlighted. For example, after the image of the banker is positioned at a specific area of the document, the banker may use a hand gesture or other input device to cause the area of the document to be highlighted. When the specific area of the document is highlighted on client computer 106, the same area of the document is highlighted on client computer 108. In this manner, the banker can position an image on an area of the document and highlight the image so that the customer can easily identify the area.

At operation 514, the customer at client computer 108 enters data in the highlighted area of the document. The data is displayed in the highlighted area of the document so that the banker can see that the customer is entering the data in the correct area of the document. The data comprises one or more alphanumeric characters. The data may correspond to a name, an address, an account ID, a social security number, etc.

At operation 516 changes to the document are saved. At operation 520, a saved copy of the document is downloaded from server computer 110 to client computer 106.

Figure 6:
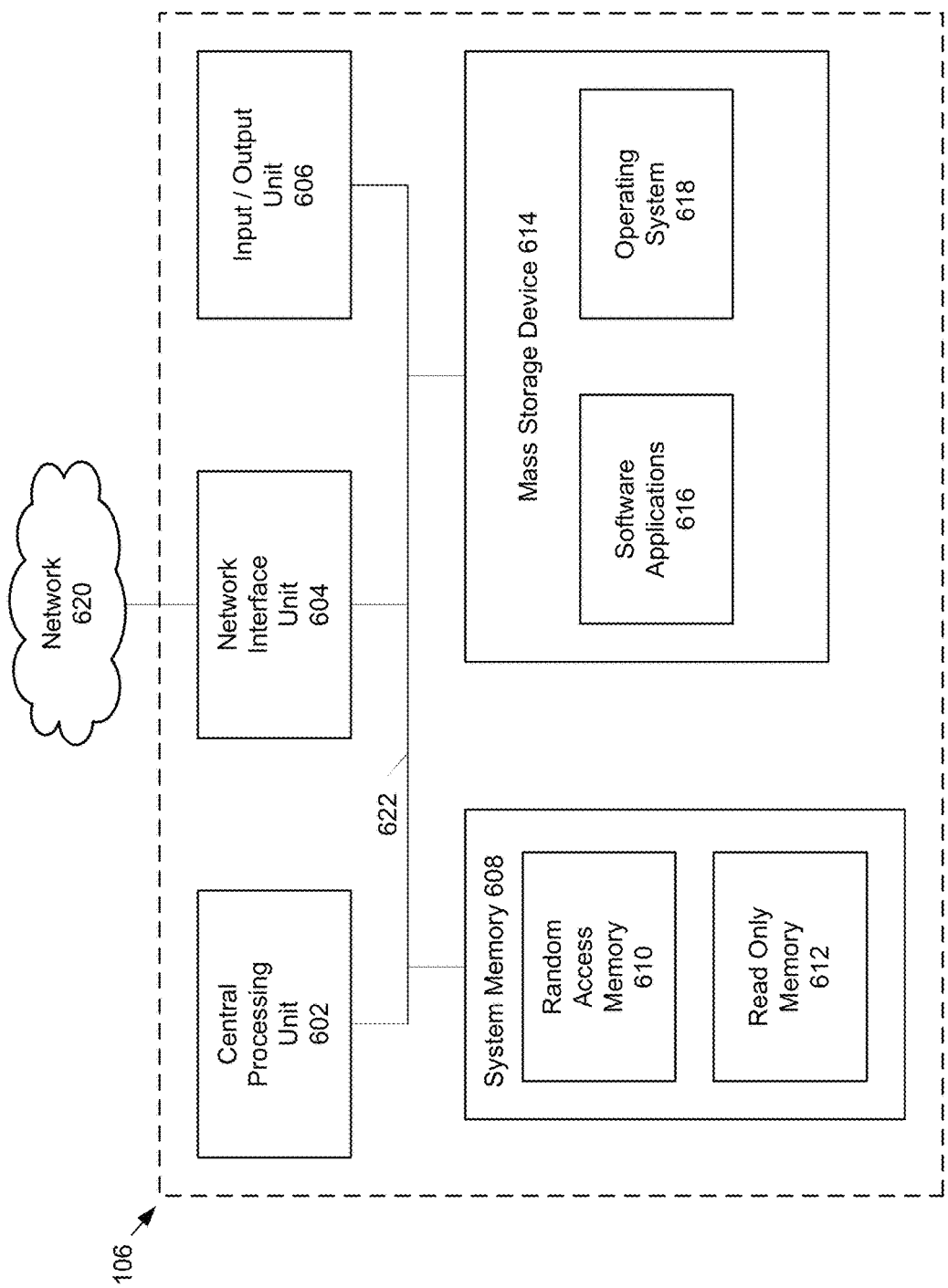
FIG. 6 shows example physical components of a client computer of FIG. 1.

As illustrated in the example of FIG. 6, the client computer 106 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the client computer 106, such as during startup, is stored in the ROM 612. The client computer 106 further includes a mass storage device 614. The mass storage device 614 is able to store software instructions and data. A central processing unit, system memory and mass storage device similar to that in FIG. 6 are also included in client computer 108, server computer 110 and any AR electronic devices that may be used in place of client computers 106 and 108.

The mass storage device 614 is connected to the CPU 602 through a mass storage controller (not shown) connected to the system bus 622. The mass storage device 614 and its associated computer-readable data storage media provide non-volatile, non-transitory storage for the client computer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the client computer 106.

According to various embodiments of the invention, the client computer 106 may operate in a networked environment using logical connections to remote network devices through the network 620, such as a wireless network, the Internet, or another type of network. The client computer 106 may connect to the network 620 through a network interface unit 604 connected to the system bus 622. It should be appreciated that the network interface unit 604 may also be utilized to connect to other types of networks and remote computing systems. The client computer 106 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the client computer 106 can store software instructions and data. The software instructions include an operating system 618 suitable for controlling the operation of the client computer 106. The mass storage device 614 and/or the RAM 610 also store software instructions, that when executed by the CPU 602, cause the client computer 106 to provide the functionality of the client computer 106 discussed in this document. For example, the mass storage device 614 and/or the RAM 610 can store software instructions that, when executed by the CPU 602, cause the client computer 106 to display received financial data on the display screen of the client computer 106.

The client computer 108 and server 110 can be computing devices that are similarly configured.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on a first electronic computing device, the method comprising:
   on the first electronic computing device, displaying a document;
   receiving an image of a person;
   overlaying the image of the person onto at least a portion of the image of the document;
   receiving one or more movements from the person;
   moving the image of the person to indicate a specific area of the document, the movement of the image of the person to the specific area of the document being based on the one or more movements from the person; and
   displaying a split screen on the first electronic computing device, a first portion of the split screen displaying the image of the person overlaid on the image of the document, and a second portion of the split screen displaying the image of the document as being displayed on a second electronic computing device,
   wherein, when the person points to a specific portion of the document on the first portion of the split screen, the image of the document on the second portion of the split screen shows the person pointing to the specific portion of the document.

2. The method of claim 1, wherein the one or more movements from the person comprise movements in a lateral direction.

3. The method of claim 1, further comprising receiving one or more gestures from the person, the one or more gestures from the person comprising one or more of moving an arm and a hand of the person.

4. The method of claim 3, wherein the first electronic computing device translates the movement of the one or more the arm and the hand of the person into a scrolling of the document on the first electronic computing device, the document being scrolled relative to the image of the person.

5. The method of claim 4, wherein the first electronic computing device translates the movement of the one or more of the arm and the hand of the person into highlighting a portion of the document on the first electronic computing device.

6. The method of claim 1, wherein the first electronic computing device is an augmented reality (AR) device and wherein the overlaying step comprises displaying the image of the person on the AR device such that, when the document is viewed through the AR device, the image of the person is virtually overlaid on the document.

7. The method of claim 6, further comprising moving the document or the AR device relative to the document such that the image of the person moves relative to the document on the AR device.

8. The method of claim 1, wherein an interactive session is established between the first electronic computing device and a server computer as part of a web conference between the person and a customer who is reviewing the document.

9. The method of claim 1, further comprising displaying data entered into the specific portion of the document to which the person is pointing, the data being entered at the second electronic computing device.

10. A method implemented on a first electronic computing device, the method comprising:
    on the first electronic computing device, displaying a financial document, the financial document including a live image of a person overlaid onto at least a portion of the financial document, the live image of the person being captured by a camera remote from the first electronic computing device;
    allowing for a selection of a writeable area of the financial document, the writeable area being identified via the image of the person overlaid on the financial document;
    receiving one or more alphanumeric characters in the writeable area of the financial document;

displaying the one or more alphanumeric characters in the writeable area of the financial document; and displaying a split screen on the first electronic computing device, including:

displaying, on a first portion of the split screen, the image of the person overlaid on the image of the document;

displaying, on a second portion of the split screen, the image of the document as being displayed on a second electronic computing device; and when the person points to a specific portion of the document on the first portion of the split screen, displaying, on the image of the document on the second portion of the split screen, the person pointing to the specific portion of the document.

11. The method of claim 10, wherein the writeable area of the financial document is identified by pointing to the writeable area by the image of the person overlaid on the financial document.

12. The method of claim 10, wherein the writeable area of the financial document is highlighted when the image of the person points to the writeable area of the financial document.

13. The method of claim 10, further comprising scrolling the financial document on the first electronic computing device, the financial document being scrolled as a result of a hand gesture by the person overlaid on the financial document, the hand gesture of the person being visible on the financial document as the financial document is scrolled.

14. The method of claim 10, further comprising displaying the financial document on a dual-use screen of the first electronic computing device, a first portion of the dual-use display screen including a portion of the financial document as viewed by an employee of a financial institution, and a second portion of the dual-use display screen including a portion of the financial document as viewed by a customer of the financial institution.

15. The method of claim 10, wherein the financial document is displayed via an augmented reality (AR) device and further comprising moving the financial document or the AR device relative to the financial document such that the image of the person moves relative to the document on the AR device.

16. The method of claim 10, wherein the financial document is displayed via an augmented reality (AR) device and wherein the financial document is an editable electronic document that is converted from an image of the financial document received at the AR device.

17. The method of claim 10, wherein the financial document is displayed on the first electronic computing device as part of a web conference between the person and a customer who is reviewing the document.

18. A first electronic computing device comprising:

a processing unit including a processor; and system memory, the system memory including instructions which, when executed by the processing unit, cause the first electronic computing device to:

display a financial document received from a server computer; receive an image of a person, the image of the person being received from a camera that is focused on the person and connected to the first electronic computing device;

superimpose the image of the person on the image of the financial document; receive one or more gestures from the person, the gestures comprising one or more of moving an arm and a hand of the person;

move the document relative to the image of the person to indicate a specific area of the financial document, the movement of the document relative to the image of the person to the specific area of the financial document being based on the one or more gestures from the person;

receive one or more additional gestures from the person focused on the specific area of the financial document;

as a result of the one or more additional gestures from the person, highlight the specific area of the financial document;

receive data for the specific area of the financial document from the server computer;

display the data in the specific area of the financial document; and display a split screen on the first electronic computing device, a first portion of the split screen displaying the image of the person overlaid on the image of the document and a second portion of the split screen displaying the image of the document as being displayed on a second electronic computing device, wherein, when the person points to a specific portion of the document on the first portion of the split screen, the image of the document on the second portion of the split screen shows the person pointing to the specific portion of the document.

* * * * *